US007134123B1

(12) United States Patent
Berry et al.

(10) Patent No.: US 7,134,123 B1
(45) Date of Patent: *Nov. 7, 2006

(54) VIRTUAL MACHINE WITH RESET OPERATION

(75) Inventors: Robert F. Berry, Braishfield (GB); Donna N. Dillenberger, Yorktown Heights, NY (US); Elizabeth A. Hutchison, Winchester (GB); Susan P. Paice, Eastleigh (GB); Donald W. Schmidt, Stone Ridge, NY (US); Alan M. Webb, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1245 days.

This patent is subject to a terminal disclaimer.

(21) Appl. No.: 09/584,641

(22) Filed: May 31, 2000

(51) Int. Cl.
*G06F 9/455* (2006.01)

(52) U.S. Cl. .......................................... 718/1; 718/107

(58) Field of Classification Search ................ 709/100, 709/101; 718/100–108, 1
See application file for complete search history.

(56) References Cited

U.S. PATENT DOCUMENTS

| 5,892,944 | A | * | 4/1999 | Fukumoto et al. | .......... 709/100 |
| 6,032,172 | A | * | 2/2000 | Kutcher | ....................... 709/102 |
| 6,374,286 | B1 | * | 4/2002 | Gee et al. | .................... 709/108 |
| 6,694,346 | B1 | * | 2/2004 | Aman et al. | ................. 718/104 |
| 6,823,509 | B1 | * | 11/2004 | Webb | ............................ 718/1 |

FOREIGN PATENT DOCUMENTS

EP  0 962 860 A2  12/1999

OTHER PUBLICATIONS

Kohl, James Arther et al. "XPVM 1.0 User's Guide." Oak Ridge National Laboratory. Nov. 1996.*
Sunderam, V.S. "PVM: A Framework for Parallel Distributed Computing." 1996.*
D. Dillenberger, et al., "Building a Java virtual machine for server application: The Jvm on OS/390", IBM Systems Journal, vol. 39, No. 1-Java Performance , Jan. 2000.
http://www.oracle.com/java/index.html?server.html, (Apr. 11, 2000).
"Delivering the Promise of Internet Computing: Integrating Java with Oracle8i", an Oracle Technical white Paper, Apr. 1999.
Oracle JServer Enterprise Edition, Technical Data Sheet, May 1999.
Oracle JServer Technical Data Sheet, May 1999.
Oracle JServer Scalability and Performance, by Jeremy Lizt, Java Products Team, Jul. 9, 1999.
Oracle JServer, Features overview, May 1999.

* cited by examiner

*Primary Examiner*—Lewis A. Bullock, Jr.
(74) *Attorney, Agent, or Firm*—Scully, Scott, Murphy & Presser, P.C.; Daniel P. Morris, Esq.

(57) ABSTRACT

A computer system includes a virtual machine supporting an object-oriented environment, in which programs to run on the virtual machine are formed from classes including methods. Applications run on the virtual machine. After a first such application has run on the virtual machine, a reset is performed on the virtual machine. The reset calls a first method in a class to perform a tidy-up operation which effectively puts the virtual machine back into a clean state. Subsequently a second application can be started on the virtual machine. As part of this start-up, the system calls a second method in the class to perform a reinitialization of the class.

29 Claims, 4 Drawing Sheets

VIRTUAL MACHINE WITH RESET OPERATION

FIELD OF THE INVENTION

The invention relates to a virtual machine supporting an object-oriented environment, in which a first application runs on the virtual machine, and the virtual machine is then reset to allow a second application to run on the virtual machine.

BACKGROUND OF THE INVENTION

Programs written in the Java programming language (Java is a trademark of Sun Microsystems Inc) are generally run in a virtual machine environment, rather than directly on hardware. Thus a Java program is typically compiled into byte-code form, and then interpreted by the Java virtual machine (JVM) into hardware commands for the platform on which the JVM is executing. The JVM itself is an application running on the underlying operating system. An important advantage of this approach is that Java applications can run on a very wide range of platforms, providing of course that a JVM is available for each platform.

Java is an object-oriented language. Thus a Java program is formed from a set of classes having methods that represent sequences of instructions (somewhat akin to subroutines). A hierarchy of classes can be defined, with each class inheriting properties (including methods) from those classes (termed superclasses) which are above it in the hierarchy. At run-time objects are created as instantiations of these classes, and indeed the classes themselves are effectively loaded as objects. One Java object can call a method in another Java object. In recent years Java has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

The standard JVM architecture is generally designed to run only a single application, although this can be multi-threaded. In a server environment used for database transactions and such-like, each transaction is typically performed as a separate application, rather than as different threads within an application. This is to ensure that every transaction starts with the JVM in a clean state. In other words, a new JVM is started for each transaction (i.e. for each new Java application). Unfortunately however this results in an initial delay in running the application (the reasons for this will be described in more detail later). The overhead due to this frequent starting and then stopping a JVM as successive transactions are processed is significant, and seriously degrades the scalability of Java server solutions.

Various attempts have been made to mitigate this problem. EP-962860-A describes a process whereby one JVM can fork into a parent and a child process, this being quicker than setting up a fresh JVM. Another approach is described in "Oracle JServer Scalability and Performance" by Jeremy Litzt, July 1999. The JServer product available from Oracle Corporation, USA, supports the concept of multiple sessions (a session effectively representing a transaction or application), each session including a JServer session. Resources such as read-only bytecode information are shared between the various sessions, but each individual session appears to its JServer client to be a dedicated conventional JVM.

U.S. patent application Ser. No. 09/304,160, filed 30 Apr. 1999 ("A long Running Reusable Extendible Virtual Machine"), assigned to IBM Corporation (IBM docket YOR9-1999-0170), discloses a virtual machine (VM) having two types of heap, a private heap and a shared heap. The former is intended primarily for storing application classes, whilst the latter is intended primarily for storing system classes and, as its name implies, is accessible to multiple VMs. The idea is that as each new VM is launched, it can access system classes already in the shared heap, without having to reload them, relink them, and so on, thereby saving significantly on start-up time. A related idea is described in "Building a Java virtual machine for server applications: the JVM on OS/390" by Dillenberger et al, IBM Systems Journal, Vol 39/1, January 2000. This describes two types of JVM, a resource-owning JVM which loads and resolves necessary system classes, and subsequent "worker" JVMs which can reuse the resolved classes. Again this implementation uses a shared heap to share system and potentially application classes for reuse by multiple workers, with each worker JVM also maintaining a private or local heap to store data private to that particular JVM process.

The above documents are focused primarily on the ability to easily run multiple JVMs in parallel. A different (and potentially complementary) approach is based on a serial rather than parallel configuration. Thus it is desirable to run repeated transactions (i.e. applications) on the same JVM, since this could avoid having to reload all the system classes at the start of each application. However, one difficulty with this is that each application expects to run on a fresh, clean, JVM, but the JVM specification states that class initialisation will be performed once and only once. If the JVM is preserved with any classes from one application to another, there is nothing to prevent the state left from a previous application somehow influencing the outcome of a new application. This unpredictability is unacceptable in most circumstances.

The problem can to some extent be alleviated by careful application design to try to undo any state changes that the application has made prior to its termination. However, this is not a robust approach, and is susceptible to unexpected events preventing such backtracking. Thus the prior art does not disclose any satisfactory method of running successive applications having the same clean initial state on a single JVM.

SUMMARY OF THE INVENTION

Accordingly, the invention provides a method of operating a computer system including a virtual machine supporting an object-oriented environment, in which programs to run on the virtual machine are formed from classes including methods, said method comprising the steps of:

running a first application on the virtual machine;

after the first application has finished running, performing a reset on the virtual machine, said reset calling a first method in at least one class to perform a tidy-up operation; and commencing a second application on the virtual machine, including calling a second method in the at least one class to perform a reinitialisation of the class.

This approach allows successive applications to run on the same virtual machine, thereby avoiding the overhead of starting up a new virtual machine for each application. This is accomplished by resetting the virtual machine, which is effectively a two-part operation. Firstly, at the conclusion of the first application, a tidyup method is utilised; the intention here is to remove any leftover material or influence from the first application to leave the virtual machine in a clean state. Secondly, at the start of the second application, a reinitialisation is performed. This effectively emulates the standard start-up of a virtual machine, and therefore makes it transparent to the second application that it is in fact re-using an existing virtual machine, as opposed to starting its own new virtual machine. Note that the second application may or may not be the same as the first application, but both should utilise at least some common middleware classes in order to benefit from this approach, so that classes used by the first application can then be reinitialised and reused by the second application.

In the preferred embodiment, the first and second applications run in a middleware environment. Those classes that are tidied up and reinitialised belong to the middleware environment; more particularly the virtual machine includes a middleware class loader, and these classes are loaded by the middleware class loader. This approach is based on the situation where the first and second applications for example represent two transactions in a middleware (e.g. database) environment. The middleware is a relatively trusted program and so is relied upon to properly perform the necessary tidyup and reinitialise operations to ensure that the reuse of the virtual machine is transparent to the applications.

In the preferred embodiment all those classes which (i) have a method to perform a tidy-up operation and (ii) have been used since the most recent reset of the virtual machine (or start of the virtual machine if no reset has yet been performed), have their first (tidyup) method called as part of the reset. The intention is that this will allow the virtual machine to be reset effectively to the state it was in before the first application ran. Once the tidyup methods are all completed a garbage collection is performed to remove any remaining objects left over from the first application that are no longer required (i.e. referenced). Note that this does not need to be a full system garbage collection but may for example look only for objects from the particular application.

In the preferred embodiment the second method (reinitialise) is called prior to the first active use of the class by the second application. A reinitialisation flag is provided for each class, and this flag is set after the second method has been called for that class. The second method is called prior to the first active use by the second application of the class. This ensures that each class used by the second application is reinitialised once and only once after each virtual machine reset.

Preferably the method further comprises the steps of monitoring the operations performed by the first application; and returning an error from the reset if the operations include any that prevent a proper reset of the virtual machine. For example, if only middleware classes have tidyup methods, then these are unlikely to be able to guarantee reversal of virtual machine state changes made by applications running on the middleware. In such a situation therefore the virtual machine monitors the application to confirm that it does not perform any potentially problematic operations; if so, this is noted, and any subsequent attempt to reset the virtual machine can be returned with a failure code.

The invention further provides a computer system including a virtual machine supporting an object-oriented environment, in which programs to run on the virtual machine are formed from classes including methods, said virtual machine including:

means responsive to a reset call after a first application has finished running on the virtual machine for performing a reset on the virtual machine, said reset calling a first method in at least one class to perform a tidy-up operation; and means responsive to commencing a second application on the virtual machine, for calling a second method in the at least one class to perform a reinitialisation of the class.

The invention further provides a computer program product, comprising computer program instructions typically recorded onto a storage medium or transmitted over a network, for implementing the above methods.

BRIEF DESCRIPTION OF THE DRAWINGS

A preferred embodiment of the invention will now be described in detail by way of example only with reference to the following drawings.

DETAILED DESCRIPTION

Figure 1:
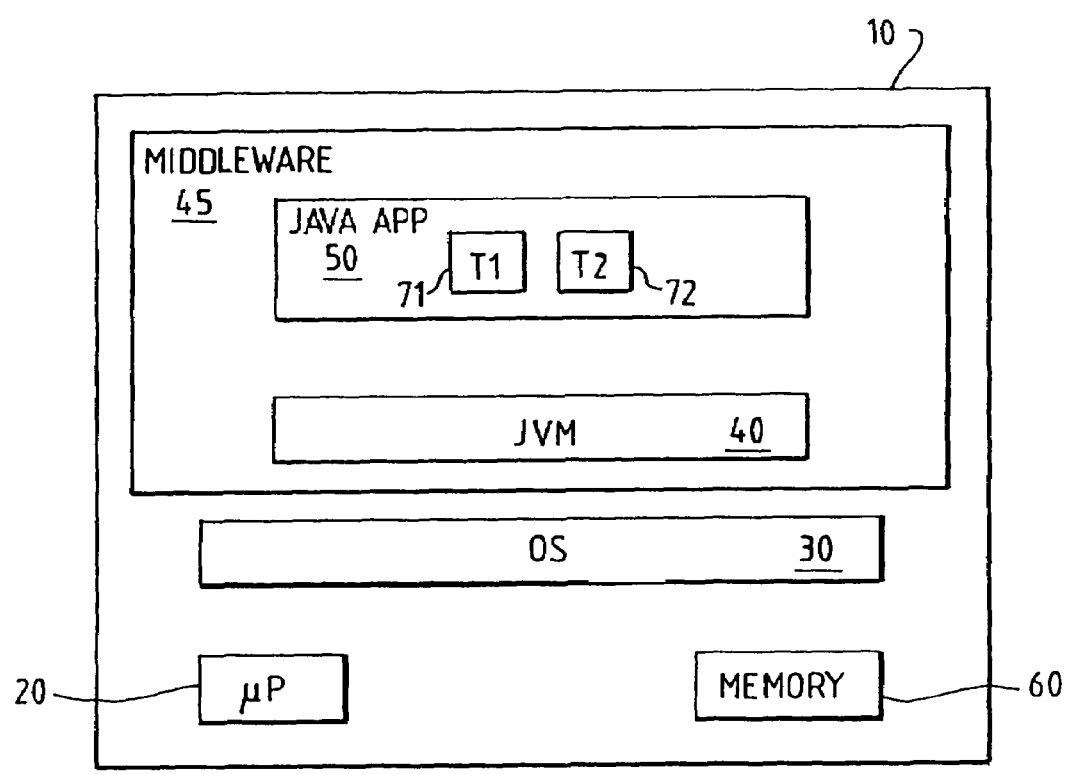
FIG. 1 shows a schematic diagram of a computer system supporting a Java Virtual Machine (JVM)

FIG. 1 illustrates a computer system 10 including a (micro)processor 20 which is used to run software loaded into memory 60. The software can be loaded into the memory by various means (not shown), for example from a removable storage device such as a floppy disc or CD ROM, or over a network such as a local area network (LAN) or telephone/modem connection, typically via a hard disk drive (also not shown). Computer system runs an operating system (OS) 30, on top of which is provided a Java virtual machine (JVM) 40. The JVM looks like an application to the (native) OS 30, but in fact functions itself as a virtual operating system, supporting Java application 50. A Java application may include multiple threads, illustrated by threads T1 and T2 71, 72.

System 10 also supports middleware subsystem 45, for example a transaction processing environment such as CICS, available from IBM Corporation. The middleware subsystem runs as an application or environment on operating system 30, and initiates the JVM 40. The middleware also includes Java programming which acts to cause transactions as Java applications 50 to run on top of the JVM 40. In accordance with the present invention, and as will be described in more detail below, the middleware can cause successive transactions to run on the same JVM. In a typical server environment, multiple JVMs may be running on computer system 10, in one or more middleware environments.

It will be appreciated that computer system 10 can be a standard personal computer or workstation, minicomputer, mainframe, or any other suitable computing device, and will typically include many other components (not shown) such as display screen, keyboard, sound card, network adapter card, etc which are not directly relevant to an understanding of the present invention. Note that computer system 10 may also be an embedded system, such as a set top box, handheld device, or any other hardware device including a processor 20 and control software 30, 40.

Figure 2:
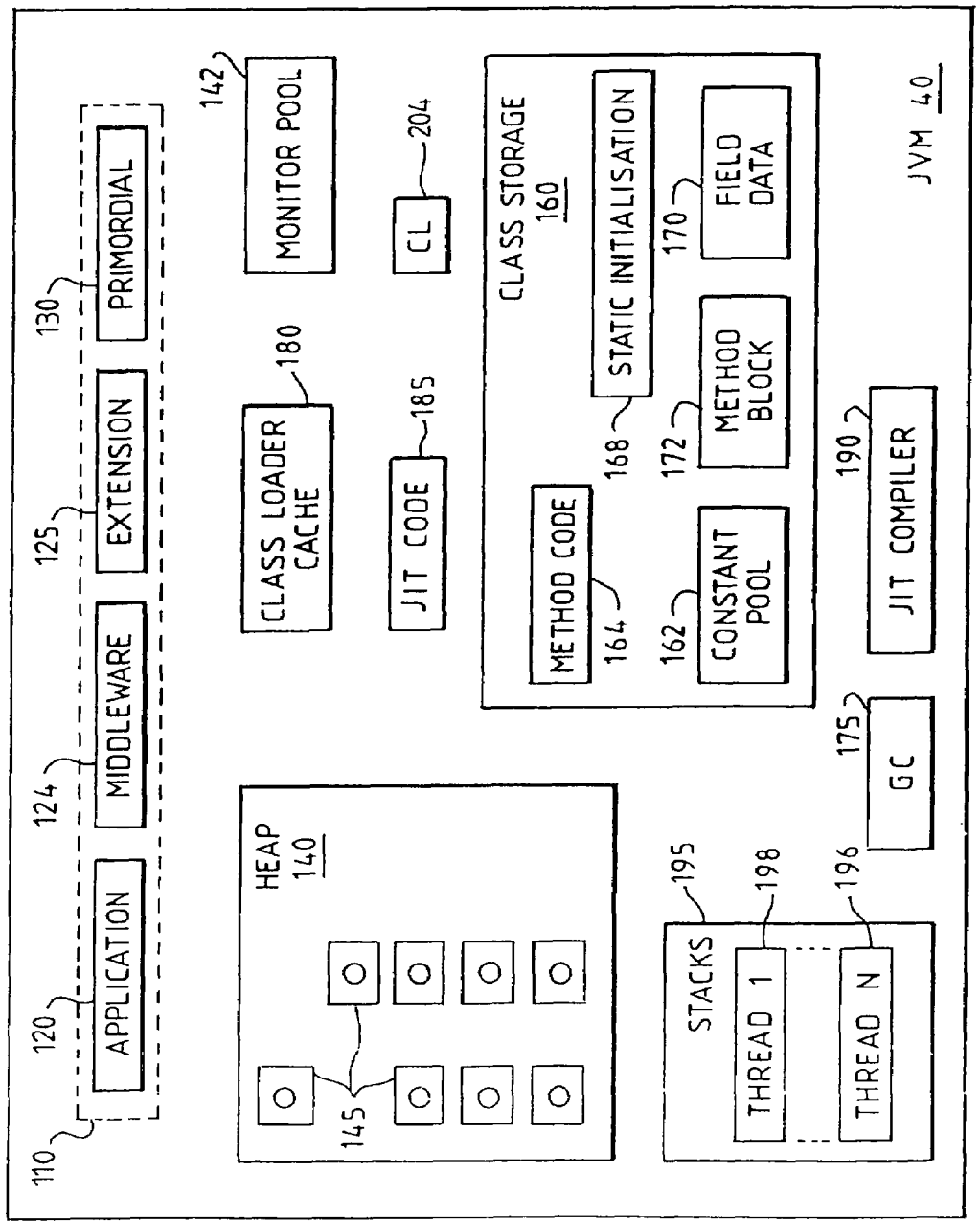
FIG. 2 illustrates some internal components of the JVM.

FIG. 2 shows the structure of JVM 40 in more detail (omitting some components which are not directly pertinent to an understanding of the present invention). The fundamental unit of a Java program is the class, and thus in order to run any application the JVM must first load the classes forming and required by that application. For this purpose the JVM includes a hierarchy of class loaders 110, which conventionally includes three particular class loaders, named Application 120, Extension 125, and Primordial 130. An application can add additional class loaders to the JVM (a class loader is itself effectively a Java program). In the preferred embodiment of the present invention, a fourth class loader is also supported, Middleware 124.

For each class included within or referenced by a program, the JVM effectively walks up the class loader hierarchy, going first to the Application class loader, then the Middleware loader, then the Extension class loader, and finally to the Primordial class loader, to see if any class loader has previously loaded the class. If the response from all of the class loaders is negative, then the JVM walks back down the hierarchy, with the Primordial class loader first attempting to locate the class, by searching in the locations specified in its class path definition. If this is unsuccessful, the Extension class loader then makes a similar attempt, if this fails the Middleware class loader tries. Finally, if this fails the Application class loader tries to load the class from one of the locations specified in its class path (if this fails, or if there is some other problem such as a security violation, the system returns an error). It will be appreciated that a different class path can be defined for each class loader. Note that if it is desired to load a further middleware class loader (i.e. one provided by the user rather than included within the JVM itself), then this can be achieved by declaring that the new class loader implements the middleware interface. This declaration by itself is sufficient for the JVM to treat it as a middleware class loader—no other method definitions or such-like are required.

The JVM further includes a component CL 204, which also represents a class loader unit, but at a lower level. In other words, this is the component that actually interacts with the operating system to perform the class loading on behalf of the different (Java) class loaders 110.

The JVM also includes a heap 140, which is shared between all threads, and is used for storage of objects 145. Each loaded class represents an object, and therefore can be found on the heap. In Java a class effectively defines a type of object, and this is then instantiated one or more times in order to utilise the object. Each such instance is itself an object which can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2).

The JVM also includes a class storage area 160, which is used for storing information relating to the class files in the heap 140. This area includes the method code region 164 for storing byte code for implementing class method calls, and a constant pool 162 for storing strings and other constants associated with a class. The class storage area also includes a field data region 170 for sharing static variables (static in this case implies shared between all instances of a class), and an area 168 for storing static initialisation methods and other specialised methods (separate from the main method code 164). The class storage area further includes a method block area 172, which is used to store information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc in class storage area 160. They also contain a reference to the class loader which loaded them into the heap, plus other fields such as a flag (not shown) to indicate whether or not they have been initialised.

The JVM further includes a storage area for just-in time (JIT) code 185, equivalent to method byte code which has already been compiled into machine code to be run directly on the native platform. This code is created by the JVM from Java byte code by a compilation process using JIT compiler 190, typically when the application program is started up or when some other usage criterion is met, and is used to improve run-time performance by avoiding the need for this code to be interpreted later.

Another component of the JVM is the stack area 195, which is used for storing the stacks 196, 198 associated with the execution of different threads on the JVM. Note that because the system libraries and indeed parts of the JVM itself are written in Java, and these frequently use multi-threading, the JVM may be supporting multiple threads even if the user application 50 running on top of the JVM contains only a single thread itself.

Also included within the JVM are class loader cache 180 and garbage collection (GC) unit 175. The former is effectively a table used to allow a class loader to trace those classes which it initially loaded into the JVM. The class loader cache therefore allows each class loader to check whether it has loaded a particular class—part of the operation of walking the class loader hierarchy described above. Note also that it is part of the overall security policy of the JVM that classes will typically have different levels of permission within the system based on the identity of the class loader by which they were originally loaded.

Garbage collection unit 175 is used to delete objects from heap 140 when they are no longer required. Thus in the Java programming language, applications do not need to specifically request or release memory, rather this is controlled by the JVM itself. Therefore, when Java application 50 creates an object 145, the JVM secures the requisite memory resource. Then, when the Java application finishes using object 145, the JVM can delete the object to free up this memory resource. This latter process is known as garbage collection, and is generally performed by briefly interrupting all threads 196, 198, and scanning the heap 140 for objects which are no longer referenced, and hence can be deleted. The details of garbage collection vary from one JVM implementation to another, but typically GC is scheduled when the heap is nearly exhausted and so there is a need to free up space for new objects.

In general a class object will not be garbage collected by the JVM unless its class loader is deleted, and unless the class is no longer executing (i.e. no longer referenced from the stack 195 or from another location such as the class cache or another object). Note that the destruction of a class loader (or more accurately, the deletion of all references to the class loader) is in fact a relatively straightforward operation, since it is simply an instance of a class, and can always be reinstantiated. Such deletion is accompanied by the removal of all relevant entries in the class loader cache. The destruction of a class loader is desirable in some instances, because it then allows any class files loaded by that class loader to be reloaded and reinitialised.

Finally, FIG. 2 shows a monitor pool 142, which is used for storing a set of locks (monitors) that are used to control contention to an object by different threads at times when exclusive access to the object is required.

Figure 3:
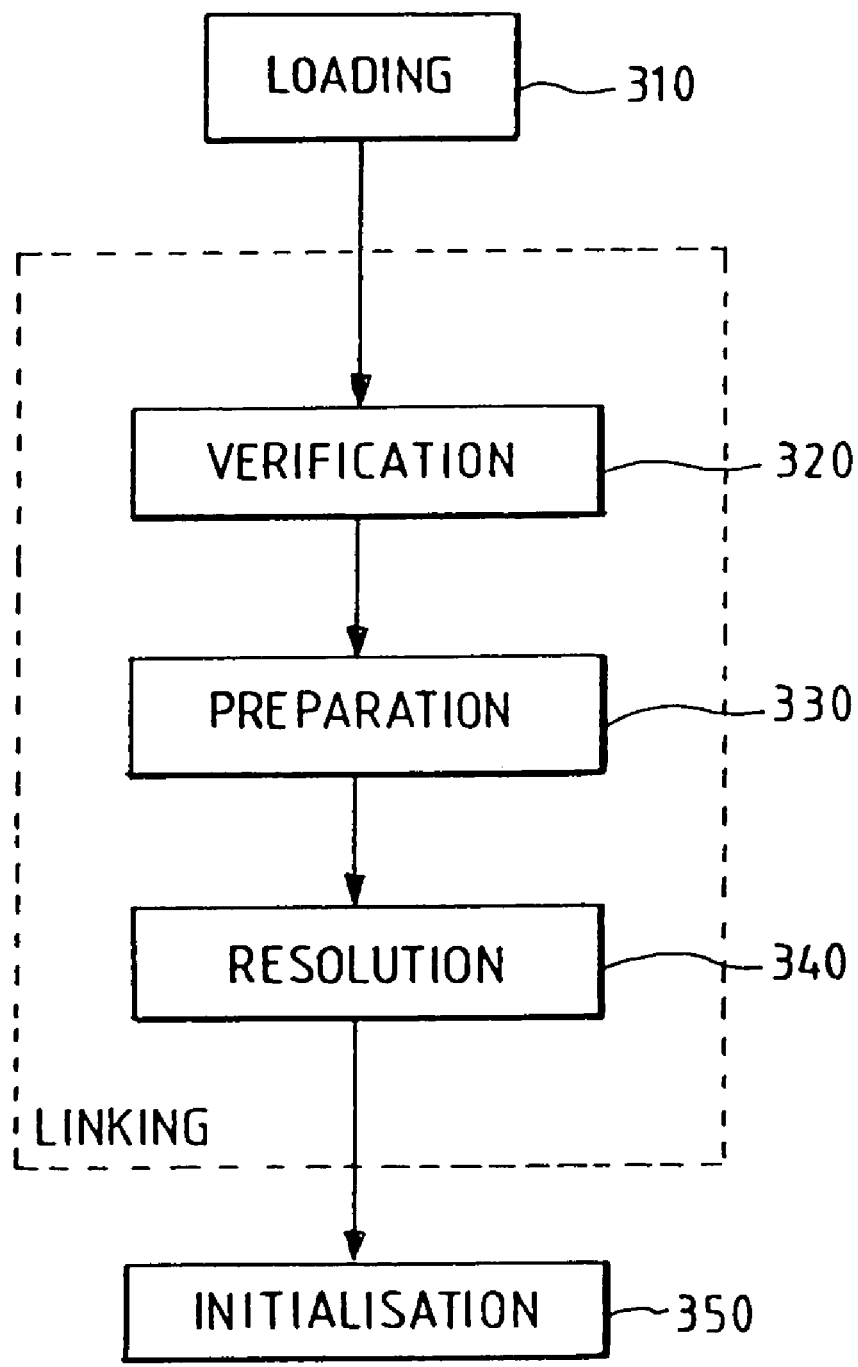
FIG. 3 is a flowchart depicting the steps required to load a class and prepare it for use.

FIG. 3 is a flowchart illustrating the operations conventionally performed to start running a Java application. The first operation is loading (step 310) in which the various class loaders try to retrieve and load a particular class. The next operation is linking, which comprises three separate steps. The first of these is verification (step 320), which essentially checks that the code represents valid Java programming, for example that each instruction has a valid operational code, and that each branch instruction goes to the beginning of another instruction (rather than the middle of an instruction). This is followed by preparation (step 330) which amongst other things creates the static fields for a class. The linking process is completed by the step of resolution, in which a symbolic reference to another class is typically replaced by a direct reference (step 340).

At resolution the JVM may also try to load additional classes associated with the current class. For example, if the current class calls a method in a second class then the second class may be loaded now. Likewise, if the current class inherits from a superclass, then the superclass may also be loaded now. This can then be pursued recursively; in other words, if the second class calls methods in further classes, or has one or more superclasses, these too may now be loaded. Note that it is up to the JVM implementation how many classes are loaded at this stage, as opposed to waiting until such classes are actually needed before loading them.

The final step in FIG. 3 is the initialisation of a loaded class (step 350), which represents calling the static initialisation method (or methods) of the class. According to the formal JVM specification, this initialisation must be performed once and only once before the first active use of a class, and includes things such as setting static (class) variables to their initial values (see the above-mentioned book by Lindholm and Yellin for a definition of "first active use"). Note that initialisation of an object also requires initialisation of its superclasses, and so this may involve recursion up a superclass tree in a similar manner to that described for resolution. The initialisation flag in a class object 145 is set as part of the initialisation process, thereby ensuring that the class initialisation is not subsequently re-run.

The end result of the processing of FIG. 3 is that a class has been loaded into a consistent and predictable state, and is now available to interact with other classes. In fact, typically at start up of a Java program and its concomitant JVM, some 1000 objects are loaded prior to actual running of the Java program itself. This gives some idea of the initial delay and overhead involved in beginning a Java application.

Figure 4:
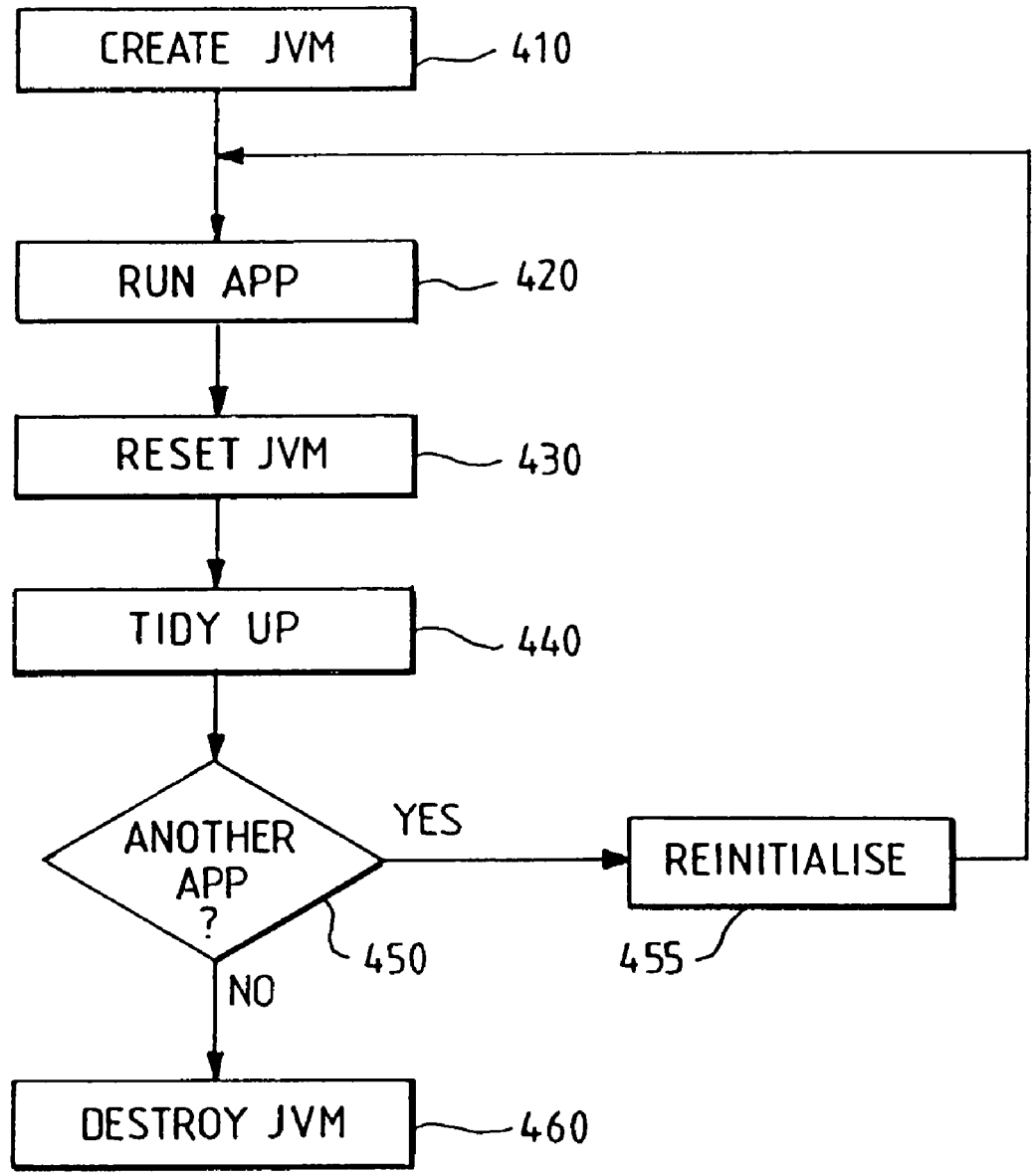
FIG. 4 is a flowchart depicting the preferred method of the present invention.

As mentioned above, the problems caused by this initial delay can be largely overcome by serial reuse of a JVM, thereby avoiding the need to reload systems classes and so on. This is achieved in accordance with the method of the present invention, which is illustrated in FIG. 4. The method commences with the start of the middleware subsystem 45, which in turn uses the Java Native Interface (JNI) to perform a Create JVM operation (step 410). Next an application or transaction to run on the JVM is loaded by the Application class loader 120. The middleware includes Java routines to provide various services to the application, and these are also loaded at this point, by the Middleware class loader 124.

The application can now be run (step 420), and in due course will finally terminate. At this point, instead of terminating the JVM as well as the application, the middleware subsystem makes a Reset JVM call to the JVM (step 430). In accordance with the present invention the middleware classes may optionally include a tidy-up method and/or a reinitialize method. Both of these are static methods. The JVM responds to the Reset JVM by calling the tidy-up method of the middleware classes (step 440). The purpose of this is to allow the middleware to leave the JVM in a tidy state, for example removing resources and closing files that are no longer required, and deleting references to the application objects. In particular, all those middleware classes which have been used since the previous JVM reset (or since the JVM was created if no resets have occurred) have their tidy-up method called, assuming of course that they have a tidy-up method (there is no requirement for them to have such a tidy-up method).

At this point the system performs a quick garbage collection cycle (possibly limited in scope to certain objects), to make sure that any class loaders and other objects belonging to the application are removed. Note that many of these objects might not have been removable by garbage collection prior to the tidy-up method, since they could still have been referenced by the middleware classes.

The tidy-up method may be similar to the finalise method of a class, which is a standard Java facility to allow an object to perform some close-down operation. However, there is an important difference in that tidy-up is a static method. This means that contrary to the finalise method it applies to the class rather than any particular object instance, and so will be called even if there are no current object instances for that class. In addition the timing of the tidy-up method is different from finalise, in that the former is called in response to a predetermined command to reset the JVM. In contrast, in accordance with the JVM specification, the finalise method is only called at garbage collection time (also in the prior art, there is no certainty that a garbage collection will necessarily occur between successive applications).

Once the tidy-up has been completed, the middleware subsystem is now in a position to determine whether or not there is another application to run on the JVM (step 450). If not, the middleware subsystem uses the JNI to make a Destroy JVM call (step 460) which terminates the JVM, thereby ending the method of FIG. 4. If on the other hand there is another application to run, then this new application is started by the middleware. The system responds to this new application by calling in due course the reinitialisation method in each of the middleware classes to be reused (step 455). The purpose of this is to allow the middleware classes to perform certain operations which they might do at initialisation, thereby sidestepping the restriction that the JVM specification prevents the initialisation method itself being called more than once. As a simple example, the reinitialisation may be used to reset a clock or a counter. As shown in FIG. 4, the system is now in a position to loop round and run another application (step 420).

It should be noted that whilst FIG. 4 indicates the distinct logical steps performed by the method of the invention, in practice these steps are not all independent. In particular calling the tidy-up methods (step 440) is part of the overall reset JVM operation (step 430), whilst as described in more detail below, calling the reinitialisation methods (step 455) is effectively part of the start-up processing of running the new application (step 420).

In order to implement the method of FIG. 4, certain support routines need to be included in the JVM 40. Firstly, when a class is loaded, the system determines whether or not it has a tidy-up method, and if so sets a flag. Then, when the class is used, the status of this flag is checked, and if set, the class is added to a list of classes whose tidy-up method is to be called when the JVM is reset. Once the tidy-up method of the class has been called, the method can then be deleted from the list. This therefore means that only those classes that have been used since the last reset are present in the list.

In terms of reinitialisation, each class object 145 in heap 140 includes a reinitialisation flag, analogous to the standard initialisation flag described previously. Thus as each class is to be used, the system checks this flag, and calls the reinitialisation method (if present) prior to the first active use of the class. Note however that the situation is actually now more complicated than with conventional initialisation, in that there are more ways in which the first active use can occur. Thus unlike for conventional initialisation, there may be existing object instances of the class, so the middleware may choose for example to run a method of a class instance, or access an instance field. Thus for any such action which may represent the first active use of a class since reset, the status of the reinitialisation flag is checked, and the reinitialisation method called, if it has not been previously (and, again, only if the class has such a method).

It will be appreciated that the first active use of a class may occur at any stage of a program, and therefore class reinitialisation (like conventional initialisation) is not necessarily completed at start-up of the program, but rather can be regarded as potentially an ongoing process throughout the running of a program.

It is generally expected that the reinitialisation method will be similar in function to the initialisation method, but there may well be some differences. For example, it may be desired to reset static variables which were initialised implicitly. Another possibility is to allow some state or resources to persist between applications; for example, if a class always outputs to one particular log file, it may be more efficient to keep this open in between successive JVMs, transparent to the application.

It should be noted that in the preferred embodiment, the ability to tidy up and reinitialise is only available for middleware classes (i.e. those loaded by the middleware class loader). This is to allow the middleware classes to be re-used by successive applications or transactions, for which they can perform various services. The basis for this approach is that typically the middleware is a relatively sophisticated and trusted application, and so can be allowed to take responsibility for proper implementation of the tidy-up and reinitialise methods. On the other hand, the transactions that run within the middleware are not treated as reliable.

Note also that the system classes themselves do not have tidyup or reinitialisation methods, despite persisting across a JVM reset. Rather, if the middleware makes any change to a system class, then the middleware itself is expected to take the necessary action (if any) for a reset with respect to the system class as part of the middleware's own tidyup operation.

An important part of the reset JVM/tidyup operation (steps 430 and 440) in the preferred embodiment is to make sure that the JVM is in a state which is amenable to being tidied up. If this is the case, the JVM is regarded as being clean, if not, it is regarded as being dirty or contaminated.

Considering this in more detail, if the application has performed certain operations, then it will not be possible for the middleware classes to be certain that their tidy-up and reinitialise methods will fully reset the system to a fresh state. With such a contaminated JVM, the system still calls the tidy-up methods of the class objects as per normal (step 440), but the return code back to the middleware associated with the reset JVM operation (step 430) effectively indicates failure. The expectation here is that the JVM would actually be terminated by the middleware subsystem at this point, as it is no longer in a predictable condition.

One important situation which would prevent the JVM from being able to properly reset is where the application has performed certain operations directly such as making security or environment changes, running native code, or performing Abstract Windowing Toolkit (AWT) operations. These affect the state of the JVM or the underlying computer system and cannot be reliably tidied up by the middleware, for the simple reason that the middleware does not necessarily know about them. Such changes could then persist through a reset JVM call, and contaminate the JVM for any future applications. In contrast, if an application performs such operations through a middleware call, then this does not cause any problems, because the middleware now does know about the situation and so can perform whatever tidyup measures are required.

The JVM thus monitors for operations that may prevent proper reset, including whether they have been performed by an application or middleware. This is determined by the JVM keeping track of its context, which is set to application context for an application class, and to middleware context for a middleware class, whilst a primordial or extension class has no impact on the existing context of application or middleware. In particular, context can be determined based on the type of class which contains the method that is currently being performed, whilst the type of class is determined from its original class loader.

As previously mentioned, the list of problematic operations given above only causes difficulty when performed in an application context, since in a middleware context it is possible for them to be reset by the appropriate tidy-up routines of the relevant middleware classes.

Another aspect which causes a problem is the existence of any application threads at reset, since essentially the application should have terminated for a JVM reset to be performed. In fact, it is possible for an application thread to be started by a tidy-up method call to a middleware class during JVM reset (or indeed by another middleware method at some earlier time), but such an application thread must have terminated by the end of the tidyup operations, otherwise an error will be returned.

It will be appreciated that the preferred embodiment described herein is based primarily on modifications to the running of the JVM itself. No modifications are required to the application (transaction) code, and indeed the running in series of multiple transactions on a single JVM is transparent to the transactions themselves. The middleware of course does need to be changed in order to include the tidy-up and reinitialise methods where appropriate. In addition, certain middleware routines might be updated to keep better track of the operations that they have performed, in order to allow easier implementation of the tidy-up method. For example, if a method performs an operation that may require subsequent tidy-up, it can set a flag. The tidy-up method when called, can then examine this flag to determine whether or not a certain measure has to be taken to properly reset the JVM.

It will be appreciated that the skilled person will be aware of many variations on the implementation described above. For example, with reference to FIG. 4, the decision of whether or not there is to be another application (step 450) could be performed immediately after the first application has concluded (i.e. straight after step 420). In this case the alternative outcomes would be to destroy the JVM (step 460) if there were no further applications, or else to reset the JVM, tidy up and reinitialiase (steps 430, 440, 455) if there were further applications. In addition, in the preferred embodiment, the tidy-up and reinitialisation are performed at the class level, but these steps might also possibly be performed at the package level. Further, the preferred embodiment represents a server embodiment, but the invention is also potentially applicable to the client embodiment, such as when it is necessary to have a quick start-up of applications. Many other modifications will be apparent to the skilled person.

The invention claimed is:

1. A method of operating a computer system including a single virtual machine supporting an object-oriented environment, in which programs to run on the single virtual machine are formed from classes including methods, said method comprising the steps of:
running a first application on the single virtual machine;
after the first application has finished running, performing a reset on the virtual machine, said reset calling a first method in at least one class to perform a tidy-up operation; and
commencing a second application on the single virtual machine, including calling a second method in the at least one class to perform a reinitialisation of the class wherein said method avoids the need to reload system classes used in running said first application.

2. The method of claim 1, wherein the first and second applications run in a middleware environment, and said at least one class is provided by the middleware environment.

3. The method of claim 2, wherein said virtual machine includes a middleware class loader, and said at least one class is loaded by the middleware class loader.

4. The method of claim 1, wherein said first and second methods are static methods which are performed on a class itself.

5. The method of claim 1, further comprising the step of determining all those classes which have a method to perform a tidy-up operation and which have been used since the most recent reset of the virtual machine or since the virtual machine was created if no resets have occurred, wherein the reset calls said first method in all said determined classes.

6. The method of claim 5, wherein a garbage collection is performed after the tidy-up operation has been performed in every class.

7. The method of claim 1, further comprising the step of maintaining a reinitialisation flag for said at least one class, and setting the flag after the second method has been called.

8. The method of claim 7, wherein the second method is called prior to the first active use by said second application of said at least one class.

9. The method of claim 1, further comprising the steps of:
monitoring the operations performed by said first application; and
returning an error from said reset if said operations include any that prevent a proper reset of the virtual machine.

10. A computer system executing a single virtual machine supporting an object-oriented environment, in which programs to run on the single virtual machine are formed from classes including methods, said computer system executing said single virtual machine including:
means responsive to a reset call after a first application has finished running on the single virtual machine for performing a reset on the single virtual machine, said reset calling a first method in at least one class to perform a tidy-up operation; and
means responsive to commencing a second application on the single virtual machine, for calling a second method in the at least one class to perform a reinitialisation of the class wherein said system avoids the need to reload system classes used in running said first application.

11. The system of claim 10, wherein the first and second applications run in a middleware environment, and said at least one class is provided by the middleware environment.

12. The system of claim 11, wherein said virtual machine includes a middleware class loader, and said at least one class is loaded by the middleware class loader.

13. The system of claim 10, wherein said first and second methods are static methods which are performed on a class itself.

14. The system of claim 10, further comprising means for determining all those classes which have a method to perform a tidy-up operation and which have been used since the most recent reset of the virtual machine or since the virtual machine was created if no resets have occurred, wherein the reset calls said first method in all said determined classes.

15. The system of claim 14, wherein a garbage collection is performed after the tidy-up operation has been performed in every class.

16. The system of claim 10, further comprising means for maintaining a reinitialisation flag for said at least one class, and means for setting the flag after the second method has been called.

17. The system of claim 16, wherein the second method is called prior to the first active use by said second application of said at least one class.

18. The system of claim 10, further comprising:
means for monitoring the operations performed by said first application; and
means for returning an error from said reset if said operations include any that prevent a proper reset of the virtual machine.

19. A computer program product comprising a storage medium containing computer instructions readable by a computer system for causing the computer to implement a single virtual machine supporting an object-oriented environment, in which programs to run on the single virtual machine are formed from classes including methods, said instructions further causing the single virtual machine to:
run a first application;
respond to a reset call after the first application has finished running by in turn calling a first method in at least one class to perform a tidy-up operation; and
commence a second application, including calling a second method in the at least one class to perform a reinitialisation of the class wherein said instructions avoids the need to reload system classes used in running said first application.

20. The program product of claim 19, wherein the first and second applications run in a middleware environment, and said at least one class is provided by the middleware environment.

21. The program product of claim 20, wherein said virtual machine includes a middleware class loader, and said at least one class is loaded by the middleware class loader.

22. The program product of claim 19, wherein said first and second methods are static methods which are performed on a class itself.

23. The program product of claim 19, further comprising instructions for causing the computer to determine all those classes which have a method to perform a tidy-up operation and which been used since the most recent reset of the virtual machine or since the virtual machine was created if no resets have occurred, wherein the reset calls said first method in all said determined classes.

24. The program product of claim 23, wherein a garbage collection is performed after the tidy-up operation has been performed in every class.

25. The program product of claim 19, further comprising instructions for causing the computer to maintain a reinitialisation flag for said at least one class, and to set the flag after the second method has been called.

26. The program product of claim 25, wherein the second method is called prior to the first active use by said second application of said at least one class.

27. The program product of claim 19, further comprising instructions for causing the computer to:

monitor the operations performed by said first application; and return an error from said reset if said operations include any that prevent a proper reset of the virtual machine.

28. A single virtual machine executing on a computer system and supporting an object-oriented environment, in which programs to run on the single virtual machine are formed from classes including methods, said single virtual machine including:

means responsive to a reset call after a first application has finished running on the single virtual machine for performing a reset on the single virtual machine, said reset calling a first method in at least one class to perform a tidy-up operation; and means responsive to commencing a second application on the single virtual machine, for calling a second method in the at least one class to perform a reinitialisation of the class wherein said virtual machine avoids the need to reload system classes used in running said first application.

29. A middleware system executing on a computer system for interacting with a single virtual machine executing on the computer system and supporting an object-oriented environment, in which programs to run on the single virtual machine are formed for classes including methods, said middleware system including:

means for starting to run a first application on the single virtual machine;

means responsive to the first application finishing running, for making a call to the single virtual machine to perform a reset operation;

means for starting to run a second application on the single virtual machine; and at least one class having a first method to perform a tidy-up operation which is called by the single virtual machine as part of said reset operation, and a second method to perform a reinitialisation of the class wherein said middleware system avoids the need to reload system classes used in running said first application.

* * * * *